United States Patent
Ohno et al.

(10) Patent No.: US 11,364,896 B2
(45) Date of Patent: Jun. 21, 2022

(54) INFORMATION PROCESSING DEVICE, INFORMATION PROCESSING METHOD, AND NON-TRANSITORY STORAGE MEDIUM STORING PROGRAM

(71) Applicant: TOYOTA JIDOSHA KABUSHIKI KAISHA, Toyota (JP)

(72) Inventors: Mitsuyoshi Ohno, Miyoshi (JP); Daiki Kubo, Toyota (JP); Yosuke Nozaki, Toyota (JP); Tsukasa Nakanishi, Nagoya (JP); Hironori Aoyama, Toyota (JP); Seiji Yogo, Nagoya (JP); Tae Sugimura, Miyoshi (JP); Yasuhiro Kobatake, Nagoya (JP); Takeshi Yamada, Anjo (JP); Ryo Sato, Nisshin (JP); Sayaka Ninoyuu, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 75 days.

(21) Appl. No.: 17/022,287

(22) Filed: Sep. 16, 2020

(65) Prior Publication Data
US 2021/0162987 A1 Jun. 3, 2021

(30) Foreign Application Priority Data
Nov. 28, 2019 (JP) .............................. JP2019-215706

(51) Int. Cl.
*B60W 30/06* (2006.01)
*G05D 1/02* (2020.01)
(Continued)

(52) U.S. Cl.
CPC .......... *B60W 30/06* (2013.01); *G05D 1/0088* (2013.01); *G05D 1/0217* (2013.01);
(Continued)

(58) Field of Classification Search
CPC ... B60W 30/06; G05D 1/0088; G05D 1/0217; H04W 4/021; H04W 4/023; H04W 4/40;
(Continued)

(56) References Cited

U.S. PATENT DOCUMENTS

2019/0197648 A1* 6/2019 Arakawa ................ G06Q 50/30
2021/0046888 A1* 2/2021 Vardharajan ......... B60N 2/0292
2021/0331702 A1* 10/2021 Kim ..................... G08G 1/0968

FOREIGN PATENT DOCUMENTS

JP 60-015064 U 2/1985
JP 02-003937 U 1/1990

* cited by examiner

*Primary Examiner* — An T Nguyen
(74) *Attorney, Agent, or Firm* — Sughrue Mion, PLLC

(57) ABSTRACT

An information processing device configured to control a traveling unit which is coupled to a resting unit including equipment on which a user takes a rest and carries the resting unit, the traveling unit being movable even while not coupled to the resting unit, the information processing device includes a control unit configured to: select a first parking lot in which the resting unit is to be arranged from among vacant parking lots within a predetermined area including a current position of a terminal owned by the user who desires to take the rest; transmit, to the terminal, information on movement from the current position of the terminal to the first parking lot; and transmit, to a first traveling unit, a command to carry a first resting unit to the first parking lot and arrange the first resting unit in the first parking lot.

20 Claims, 10 Drawing Sheets

(51) Int. Cl.
*H04W 4/40* (2018.01)
*H04W 4/021* (2018.01)
*H04W 4/02* (2018.01)
*G05D 1/00* (2006.01)

(52) U.S. Cl.
CPC ........... *H04W 4/021* (2013.01); *H04W 4/023* (2013.01); *H04W 4/40* (2018.02)

(58) Field of Classification Search
CPC ...... H04W 4/025; H04W 4/024; G08G 1/144; G08G 1/096805; G08G 1/096833; G06Q 50/30; B60R 16/037
See application file for complete search history.

| USER ID | CURRENT POSITION | RESTING STATE |
|---|---|---|
| U001 | L10 | REQUESTED |
| U002 | L20 | ARRANGED |
| U003 | L30 | ARRANGED |
| U004 | L40 | FINISHED |
| ... | ... | ... |

| PARKING LOT ID | POSITION | VACANT PARKING SPACE |
|---|---|---|
| P001 | L011 | EXISTS |
| P002 | L012 | NONE |
| P003 | L013 | NONE |
| P004 | L014 | EXISTS |
| ... | ... | ... |

| RESTING UNIT ID | POSITION INFORMATION | OPERATING STATE | USER ID |
|---|---|---|---|
| E01 | F01 | STAND-BY | |
| E02 | F02 | OPERATING | U002 |
| E03 | F03 | OPERATING | U003 |
| E04 | F04 | UNDER MAINTENANCE | |
| ... | ... | ... | ... |

| TRAVELING UNIT ID | POSITION INFORMATION | OPERATING STATE |
|---|---|---|
| G01 | F01 | STAND-BY |
| G02 | F02 | OPERATING |
| G03 | F03 | OPERATING |
| G04 | F04 | STAND-BY |
| ... | ... | ... |

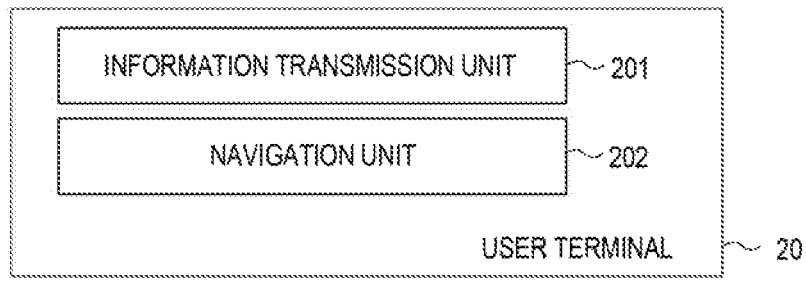
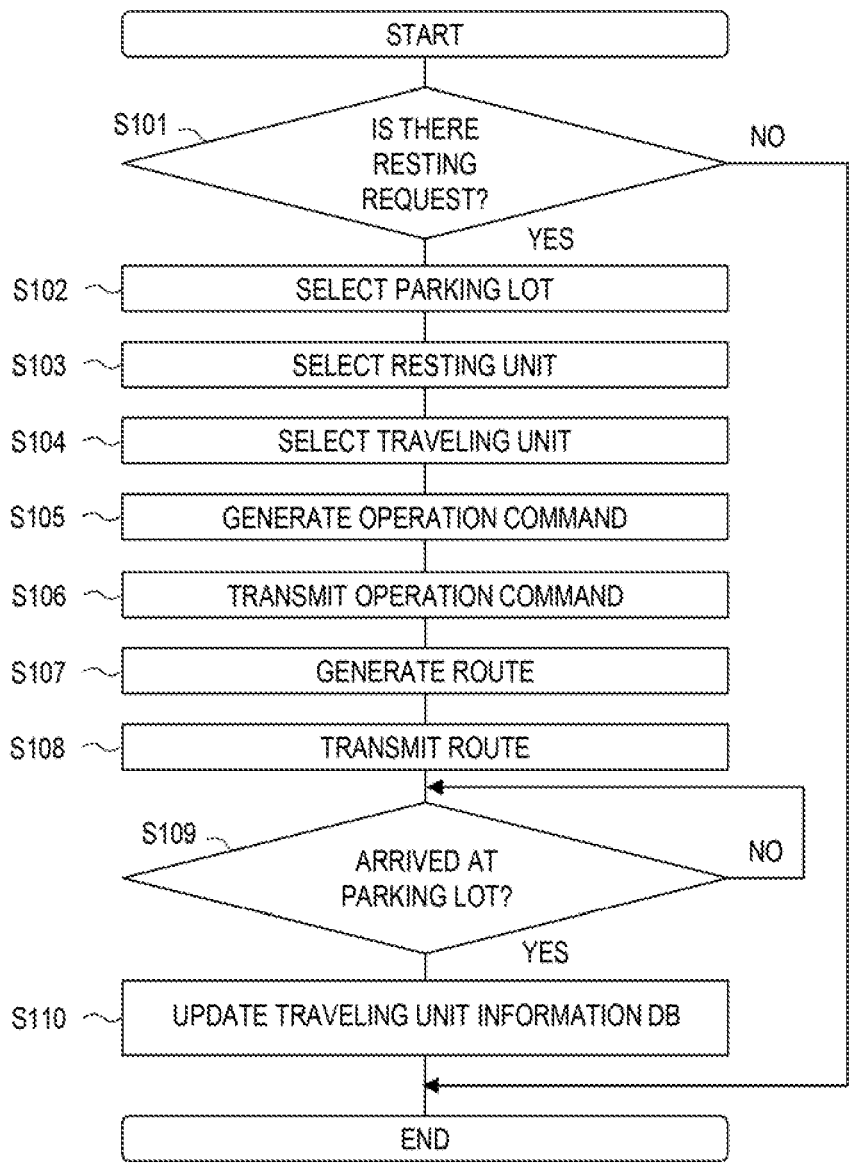

INFORMATION PROCESSING DEVICE, INFORMATION PROCESSING METHOD, AND NON-TRANSITORY STORAGE MEDIUM STORING PROGRAM

CROSS-REFERENCE TO RELATED APPLICATION

This application claims priority to Japanese Patent Application No. 2019-215706 filed on Nov. 28, 2019, incorporated herein by reference in its entirety.

BACKGROUND

1. Technical Field

The present disclosure relates to an information processing device, an information processing method, and a non-transitory storage medium storing a program.

2. Description of Related Art

A technology, in which a camping house that can be loaded and unloaded can be carried while placed on a truck bed is well-known (see, for example, Japanese Unexamined Utility Model Application Publication No. 02-003937).

SUMMARY

The present disclosure more quickly provides a place in which a person can take a rest.

One aspect of the present disclosure is an information processing device configured to control a traveling unit which is coupled to a resting unit including equipment on which a user takes a rest and carries the resting unit. The traveling unit is movable even while not coupled to the resting unit. The information processing device includes a control unit configured to select a first parking lot in which the resting unit is to be arranged from among vacant parking lots within a predetermined area including a current position of a terminal owned by the user who desires to take the rest, transmit, to the terminal, information on movement from the current position of the terminal to the first parking lot, and transmit, to a first traveling unit, a command to carry a first resting unit to the first parking lot and arrange the first resting unit in the first parking lot.

A second aspect of the present disclosure is an information processing method for controlling a traveling unit which is coupled to a resting unit including equipment on which a user takes a rest and carries the resting unit, and is executed by a computer. The traveling unit is movable even while not coupled to the resting unit. The information processing method includes selecting a first parking lot in which the resting unit is to be arranged from among vacant parking lots within a predetermined area including a current position of a terminal owned by the user who desires to take the rest, transmitting, to the terminal, information on movement from the current position of the terminal to the first parking lot, and transmitting, to a first traveling unit, a command to carry a first resting unit to the first parking lot and arrange the first resting unit in the first parking lot.

A third aspect of the present disclosure is a non-transitory storage medium storing a program that causes a computer to control a traveling unit which is coupled to a resting unit including equipment on which a user takes a rest and carries the resting unit. The traveling unit is movable even while not coupled to the resting unit. The program causes the computer to execute selecting a first parking lot in which the resting unit is to be arranged from among vacant parking lots within a predetermined area including a current position of a terminal owned by the user who desires to take the rest, transmitting, to the terminal, information on movement from the current position of the terminal to the first parking lot, and transmitting, to a first traveling unit, a command to carry a first resting unit to the first parking lot and arrange the first resting unit.

With each aspect of the present disclosure, it is possible to more quickly provide a place in which a user can take a rest.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram illustrating an example of a functional configuration of the user terminal;

FIG. 10 is an example of a flowchart of a process for transmitting an operation command according to a first embodiment;

DETAILED DESCRIPTION OF EMBODIMENTS

Figure 1:
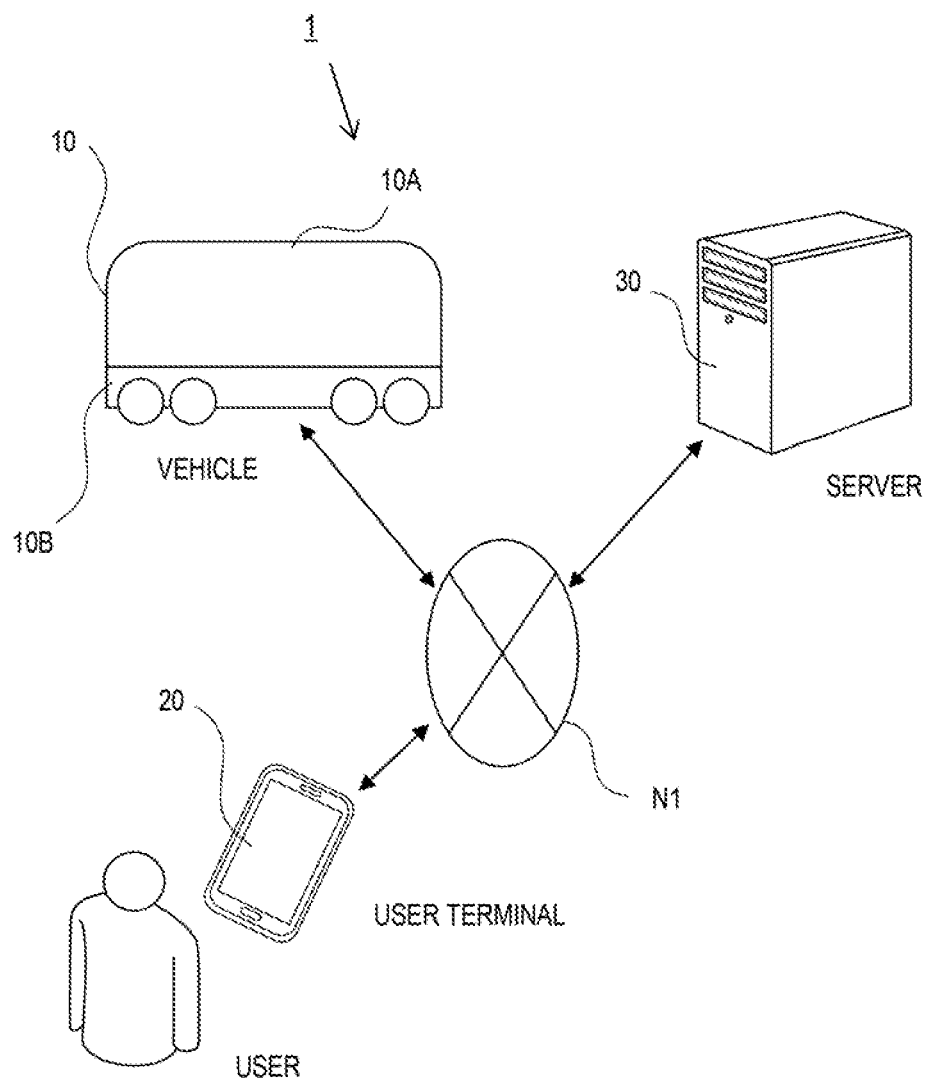
FIG. 1 is a diagram illustrating a schematic configuration of an autonomous driving system according to an embodiment.

A traveling unit controlled by an information processing device, which is a first aspect of the present disclosure, may be, for example, a vehicle that autonomously travels based on an operation command. The traveling unit can be coupled to a resting unit, and can carry the resting unit while coupled thereto. The resting unit includes equipment on which a user can take a rest. For example, the resting unit includes a bed on which the user can sleep. The traveling unit can travel even while not coupled to the resting unit. Thus, after arranging the resting unit in a place, the traveling unit can move away from that place.

A control unit selects a first parking lot in which the resting unit will be arranged. The first parking lot is selected from among vacant parking lots within a predetermined area including a current position of a terminal of the user. The user terminal may transmit information on the current position by an operation of the user, or, for example, at every predetermined time, not by the user's operation. The current position of the user terminal may be regarded as the same as that of the user. The predetermined area is an area in which the user can easily take a rest, and, for example, an area at which the user can arrive by walking. The predetermined area may be designated by the user. The control unit may select the first parking lot according to prescribed rules or may randomly select the first parking lot.

The control unit transmits, to the user terminal, information on movement to the first parking lot. The information transmitted to the user terminal includes information required when the user moves to the first parking lot. For example, the information includes a route from the current position of the user terminal to the parking lot, an address of the parking lot, or the latitude and longitude of the parking lot. According to the information, the user can easily move to the first parking lot.

Further, the control unit transmits, to a first traveling unit, a command to carry the first resting unit to the first parking lot and arrange the first resting unit therein. The first resting unit is provided to the user, and the first traveling unit carries the first resting unit to the first parking lot. According to the command, the first traveling unit arranges the first resting unit in the first parking lot. Accordingly, the user can take a rest in the first resting unit. As such, the user can quickly take a rest at a nearby vacant parking lot.

The control unit may generate the command such that the first traveling unit moves away from the first parking lot after arranging the first resting unit therein. The first resting unit can serve as a resting place even while not coupled to the first traveling unit. Therefore, the first traveling unit can be decoupled from the first resting unit and move to another place after arranging the first resting unit in the first parking lot. Accordingly, while the user is taking a rest in the first resting unit, the first traveling unit can further carry another resting unit.

The control unit may include, in the command, information on movement of the first traveling unit from a current position of the first traveling unit through a current position of the first resting unit to the first parking lot. Since the control unit transmits such information to the first traveling unit, the first traveling unit can easily move to the current position of the first resting unit and easily carry the first resting unit to the first parking lot.

The control unit may select, as the first parking lot, a parking lot closest to the current position of the user terminal from among the vacant parking lots. By selecting the first parking lot in such a manner, a movement distance of the user becomes short, and thus it is possible for the user to easily move.

The control unit may select a first resting unit and a first traveling unit such that a movement distance of the first traveling unit from a current position of the first traveling unit to the first parking lot is within a predetermined distance. The predetermined distance may be, for example, a movement distance within an allowable range. The allowable range of the movement distance may be set based on an allowable stand-by time of the user or an allowable traveling cost of the traveling unit. By selecting the first resting unit and the first traveling unit in such a manner, it is possible to prevent a long time from being taken until the first traveling unit arranges the first resting unit in the first parking lot.

The control unit may select a first resting unit and a first traveling unit such that a movement distance of the first traveling unit from a current position of the first traveling unit to the first parking lot is shortest. By selecting the first resting unit and the first traveling unit in such a manner, it is possible to more quickly arrange the first resting unit in the first parking lot.

When the control unit acquires information that the user has left the first resting unit, the control unit may transmit, to a second traveling unit, a command to collect the first resting unit. The information that the user has left the first resting unit is transmitted from, for example, the user terminal, a terminal provided in the first resting unit, or a terminal provided in the first parking lot. The second traveling unit may be the same as, or different from, the first traveling unit. For example, when the control unit receives the information that the user has left the first resting unit, the control unit may select any traveling unit from among traveling units that are not coupled to the resting unit. Since the second traveling unit collects the first resting unit in such a manner, it is possible to, for example, maintain the first resting unit.

The control unit may include, in the command transmitted to the second traveling unit, information on movement of the second traveling unit from a current position of the second traveling unit through the first parking lot to a predetermined place. Examples of the predetermined place may include a place in which the resting unit stands by, a place in which the resting unit is stored, or a maintenance shop of the resting unit. By moving the second traveling unit in such a manner, it is possible to easily carry the first resting unit to the predetermined place.

The control unit may select a second traveling unit such that a movement distance of the second traveling unit from a current position of the second traveling unit to the first parking lot is within a second predetermined distance. The second predetermined distance may be, for example, a movement distance within an allowable range. The allowable range of the movement distance may be set based on the allowable traveling cost of the traveling unit. By selecting the second traveling unit in such a manner, it is possible to quickly carry the first resting unit to the predetermined place.

The control unit may select a second traveling unit such that a movement distance of the second traveling unit from a current position of the second traveling unit to the first parking lot is shortest. By selecting the second traveling unit in such a manner, it is possible to more quickly carry the first resting unit to the predetermined place.

The control unit may select a first resting unit based on information on options acquired from the user terminal. Examples of the information on the options include information on equipment that can be selected, such as information on the size or the number of beds, information on whether there is a shower, and information on whether there is a bathroom. By selecting the first resting unit corresponding to options desired by the user, it is possible to enhance the user's satisfaction.

Hereinafter, embodiments of the present disclosure will be described with reference to the drawings. Configurations of the following embodiments are mere examples, and the present disclosure is not limited thereto. Further, the following embodiments can be combined as much as possible.

First Embodiment

FIG. 1 is a diagram illustrating a schematic configuration of an autonomous driving system 1 according to an embodiment. The autonomous driving system 1 includes, for example, a vehicle 10, a user terminal 20, and a server 30. The vehicle 10 includes, for example, a resting unit 10A and a traveling unit 10B. The resting unit 10A can be decoupled from the traveling unit 10B. Moreover, the resting unit 10A can be coupled to another traveling unit 10B. The number of vehicles 10 is not limited to one as exemplified in FIG. 1, and may be two or more. The traveling unit 10B is a mobile object that can autonomously travel based on an operation command generated by the server 30. In FIG. 1, a user is a person who operates the user terminal 20 and requests that he/she take a rest in a parking lot. Information on a resting request is transmitted from the user terminal 20 to the server 30 according to the content input to the user terminal 20 by the user. The number of users may be plural, and corresponding to the number of users, the number of user terminals 20 may also be plural.

The autonomous driving system 1 illustrated in FIG. 1 is a system in which the server 30 provides the resting unit 10A that serves as a resting place at the user's resting request. The user transmits information on the resting request to the server 30 via the user terminal 20. The server 30 finds a parking lot in which the user can take a rest and transmits, to the traveling unit 10B, information on movement such that the traveling unit 10B carries the resting unit 10A to the parking lot. In addition, the server 30 transmits, to the user terminal 20, information on movement of the user such that the user can move to the parking lot in which the resting unit 10A will be arranged.

The resting unit 10A serves as a resting place for the user. For example, the resting unit 10A may include a bed on which the user can sleep. The traveling unit 10B carries the resting unit 10A while coupled thereto. The resting unit 10A can be moved by being coupled to the traveling unit 10B. Moreover, the resting unit 10A can serve as a resting place even while decoupled from the traveling unit 10B. In addition, the traveling unit 10B can move even while not coupled to the resting unit 10A. Further, in FIG. 1, the resting unit 10A can be vertically decoupled from the traveling unit 10B, but not limited thereto, and the resting unit 10A can be, for example, decoupled from the traveling unit 10B in the back and forth direction.

Upon receiving the information on the resting request from the user terminal 20, the server 30 searches for a vacant parking lot within a predetermined area from a current position of the user terminal 20 (may be a current position of the user). The resting unit 10A can be arranged in the parking lot. The predetermined area may be, for example, an area at which the user can arrive by walking from his/her current position. Further, the predetermined area may be, for example, an area in which the user desires to take a rest. In this case, the user may input the area in which the user desires to take a rest to the user terminal 20 and transmit information on the area to the server 30. Information on a vacant parking lot is acquired from, for example, a computer installed in the parking lot or a server that manages the parking lot.

The server 30 selects one parking lot (a first parking lot) from among vacant parking lots within the predetermined area and guides the user to the parking lot. The server 30 may transmit, to the user terminal 20, for example, information on a position of the parking lot which is a destination, a map showing a way to the parking lot, or information on a route to the parking lot.

The server 30 also transmits, to the traveling unit 10B, a command to move to the selected parking lot. The command may include, for example, the information on the position of the parking lot or the information on the route to the parking lot. The command includes a command to pass through a current position of the resting unit 10A in order to be coupled to the resting unit 10A. The command also includes a command to be coupled to the resting unit 10A and carry the resting unit 10A to the parking lot, and a command to be decoupled from the resting unit 10A in the parking lot. The traveling unit 10B decoupled from the resting unit 10A in the parking lot can autonomously travel to move to another place. Accordingly, the traveling unit 10B can carry another resting unit 10A.

The traveling unit 10B, the user terminal 20, and the server 30 are connected to one another via a network N1. The network N1 may be, for example, a world-wide public communication network, such as the Internet, and a wide area network (WAN) or another communication network may be employed as the network N1. In addition, the network N1 may include a telephone communication network, such as a mobile phone, and a wireless communication network, such as Wi-Fi®.

Hardware Configuration

Figure 2:
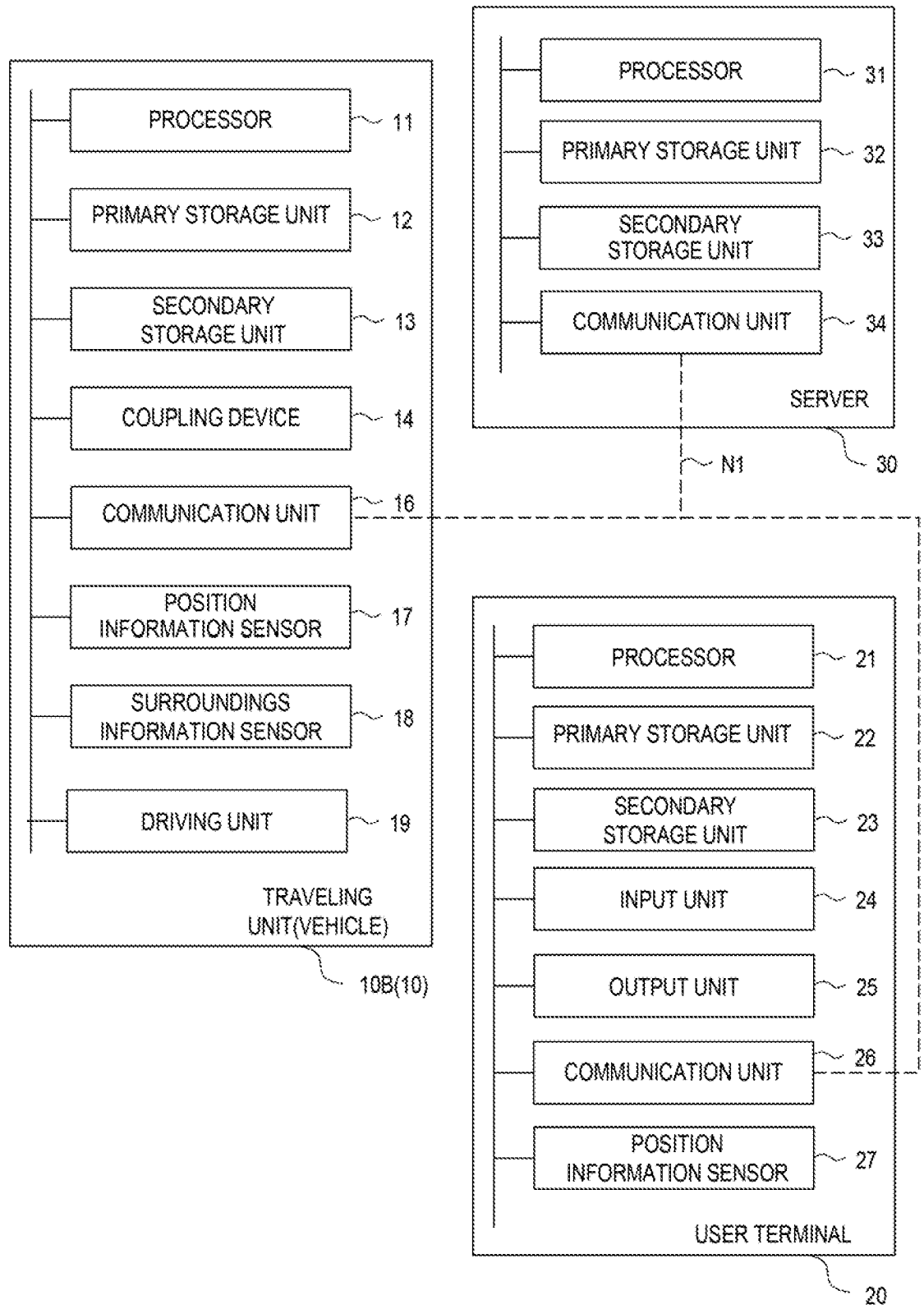
FIG. 2 is a block diagram schematically illustrating an example of a configuration of each of a traveling unit (a vehicle), a user terminal, and a server that compose the autonomous driving system according to the embodiment.

Hardware configurations of the traveling unit 10B, the user terminal 20, and the server 30 will be described with reference to FIG. 2. FIG. 2 is a block diagram schematically illustrating an example of a configuration of each of the traveling unit 10B (the vehicle 10), the user terminal 20, and the server 30 that compose the autonomous driving system 1 according to the present embodiment.

The server 30 has a general computer configuration. The server 30 includes a processor 31, a primary storage unit 32, a secondary storage unit 33, and a communication unit 34. They are connected to one another via buses.

Examples of the processor 31 include a central processing unit (CPU) and a digital signal processor (DSP). The processor 31 controls the server 30 and executes calculations of various information processes. The processor 31 is an example of the "control unit". Examples of the primary storage unit 32 include a random access memory (RAM) and a read-only memory (ROM). Examples of the secondary storage unit 33 include an erasable programmable ROM (EPROM), a hard disk drive (HDD), and a removable medium. The secondary storage unit 33 stores an operating system (OS), various programs, various tables, and the like. The processor 31 loads a program stored in the secondary storage unit 33 into a work area of the primary storage unit 32 and executes the program, such that each component, and the like, is controlled. Accordingly, the server 30 implements a function corresponding to a predetermined purpose. The primary storage unit 32 and the secondary storage unit 33 are computer-readable recording media. Moreover, the server 30 may be a single computer or a plurality of computers that is linked to one another. Information stored in the secondary storage unit 33 may be stored in the primary storage unit 32.

On the other hand, information stored in the primary storage unit 32 may be stored in the secondary storage unit 33.

The server 30 communicates with the traveling unit 10B and the user terminal 20 via the network N1 via the communication unit 34. Examples of the communication unit 34 include a local area network (LAN) interface board or a wireless communication circuit for wireless communication. The LAN interface board or the wireless communication circuit is connected to the network N1.

A series of processes executed by the server 30 can be implemented by hardware, but can also be implemented by software. The hardware configuration of the server 30 is not limited to that illustrated in FIG. 2. Moreover, a part or the whole of the configuration of the server 30 may be mounted on the traveling unit 10B.

Next, the traveling unit 10B will be described. The traveling unit 10B includes a processor 11, a primary storage unit 12, a secondary storage unit 13, a coupling device 14, a communication unit 16, a position information sensor 17, a surroundings information sensor 18, and a driving unit 19. They are connected to one another via buses. Since the processor 11, the primary storage unit 12, the secondary storage unit 13, and the communication unit 16 are respectively the same as the processor 31, the primary storage unit 32, the secondary storage unit 33, and the communication unit 34 of the server 30, description thereof will be omitted.

The coupling device 14 couples or decouples the resting unit 10A to or from the traveling unit 10B based on a control command generated by the processor 11. The coupling device 14 includes, for example, a slope, a rail, a crane, and the like, via which the resting unit 10A is coupled to the traveling unit 10B. The coupling device 14 includes an actuator, which is activated when the resting unit 10A is coupled to or decoupled from the traveling unit 10B. A method of coupling the resting unit 10A to the traveling unit 10B is not limited.

The traveling unit 10B is connected to the network N1 via the communication unit 16. The communication unit 16 is a circuit that communicates with another device (such as the server 30) via the network N1 using, for example, a mobile communication service (for example, a telephone communication network, such as Fifth Generation (5G), Fourth Generation (4G), Third Generation (3G), and Long-term Evolution (LTE)) or a wireless communication network, such as Wi-Fi®.

The position information sensor 17 acquires position information (for example, the latitude and longitude) of the traveling unit 10B at predetermined intervals. Examples of the position information sensor 17 include a global positioning system (GPS) receiving unit and a wireless communication unit. The information acquired by the position information sensor 17 is recorded in, for example, the secondary storage unit 13 and transmitted to the server 30.

The surroundings information sensor 18 senses a state or surroundings of the traveling unit 10B. An acceleration sensor, a speed sensor, or an azimuth sensor may be used as the sensor that senses the state of the traveling unit 10B. In addition, a stereo camera, a laser scanner, a LIDAR, a radar, and the like, may be used as the sensor that senses the surroundings of the traveling unit 10B.

The driving unit 19 causes the traveling unit 10B to travel based on the control command generated by the processor 11. The driving unit 19 includes, for example, a motor that drives wheels provided at the traveling unit 10B, an inverter, a brake, a steering mechanism, or the like. By driving the motor, the brake, or the like, according to the control command, the traveling unit 10B can autonomously travel.

Next, the user terminal 20 will be described. The user terminal 20 is a small computer, such as a smart-phone, a mobile phone, a tablet terminal, a personal information terminal, a wearable computer (a smart watch or the like), and a personal computer (PC). The user terminal 20 includes a processor 21, a primary storage unit 22, a secondary storage unit 23, an input unit 24, an output unit 25, a communication unit 26, and a position information sensor 27. They are connected to one another via buses. Since the processor 21, the primary storage unit 22, the secondary storage unit 23, the communication unit 26, and the position information sensor 27 are respectively the same as the processor 11, the primary storage unit 12, the secondary storage unit 13, the communication unit 16, and the position information sensor 17 of the traveling unit 10B, description thereof will be omitted.

The input unit 24 receives an input operation by the user, and is, for example, a touch panel and a push button. The output unit 25 presents information to the user, and is, for example, a liquid crystal display (LCD), an electroluminescence (EL) panel, a speaker, and a lamp. The input unit 24 and the output unit 25 may be configured as one touch panel display.

Functional Configuration: Server

Figures 3, 4, 5:
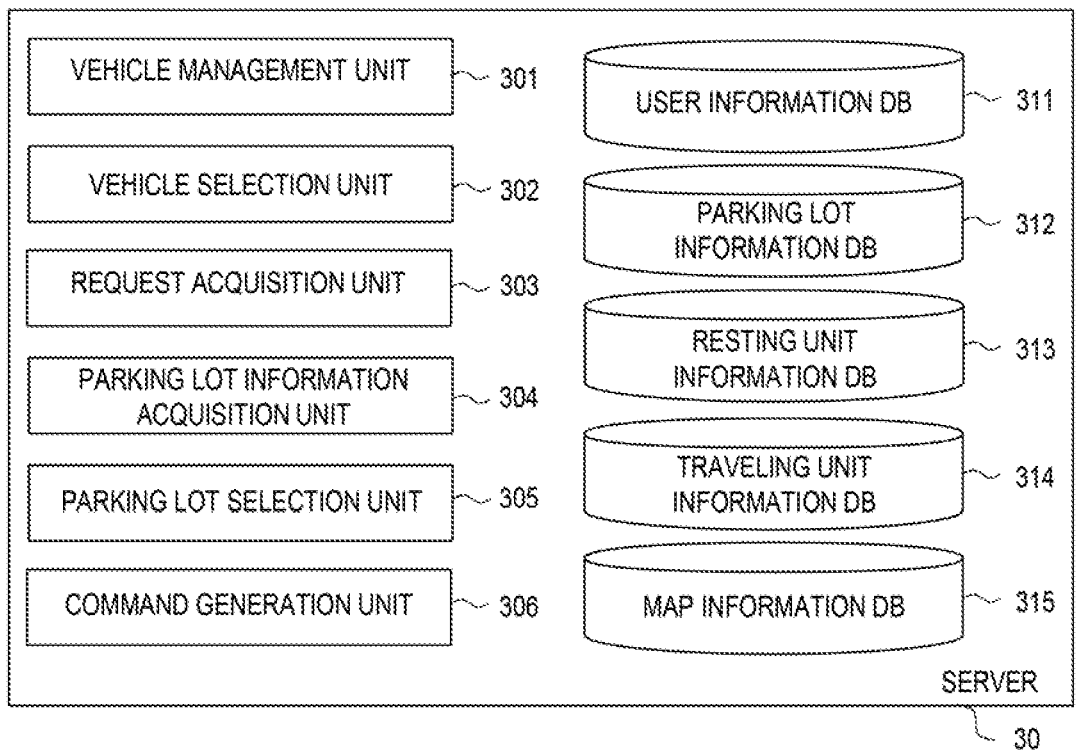
FIG. 3 is a diagram illustrating an example of a functional configuration of the server.
FIG. 4 is a table exemplifying a composition of user information.
FIG. 5 is table exemplifying a composition of parking lot information.

FIG. 3 is a diagram illustrating an example of a functional configuration of the server 30. The server 30 includes, as functional components, a vehicle management unit 301, a vehicle selection unit 302, a request acquisition unit 303, a parking lot information acquisition unit 304, a parking lot selection unit 305, a command generation unit 306, a user information database (DB) 311, a parking lot information DB 312, a resting unit information DB 313, a traveling unit information DB 314, and a map information DB 315. The vehicle management unit 301, the vehicle selection unit 302, the request acquisition unit 303, the parking lot information acquisition unit 304, the parking lot selection unit 305, and the command generation unit 306 are functional components provided when, for example, the processor 31 of the server 30 executes various programs that are stored in the secondary storage unit 33.

The user information DB 311, the parking lot information DB 312, the resting unit information DB 313, the traveling unit information DB 314, and the map information DB 315 are, for example, relational databases that are constructed when a program of a database management system (DBMS) executed by the processor 31 manages data stored in the secondary storage unit 33. Any of the functional components of the server 30 or a part of the processes thereof may be executed by another computer connected to the network N1.

The vehicle management unit 301 manages various pieces of information on the resting unit 10A and the traveling unit 10B. The vehicle management unit 301 manages, for example, a position and an operating state of the resting unit 10A, and a position and an operating state of the traveling unit 10B. The vehicle management unit 301 acquires and manages, for example, position information transmitted from the traveling unit 10B of the vehicle 10 at predetermined intervals or the position information transmitted from the traveling unit 10B in response to a request from the server 30. When the resting unit 10A is coupled to the traveling unit 10B, position information of the coupled resting unit 10A is regarded as the same as that of the traveling unit 10B. On the other hand, when the resting unit 10A is decoupled from the traveling unit 10B, the position information of the resting unit 10A is regarded as the same as that of the traveling unit 10B at a time when the traveling unit 10B is decoupled from the resting unit 10A. The vehicle management unit 301 stores the position information of the resting unit 10A in the resting unit information DB 313 in association with a resting unit ID. The resting unit ID is an identifier unique to the resting unit 10A. Further, the vehicle management unit 301 stores the position information of the traveling unit 10B in the traveling unit information DB 314 in association with a traveling unit ID. The traveling unit ID is an identifier unique to the traveling unit 10B.

Moreover, the vehicle management unit 301 manages the operating states of the resting unit 10A and the traveling unit 10B of the vehicle 10. The operating state of the resting unit 10A is information for determining which state the resting unit 10A is in. The operating state of the resting unit 10A is divided into three states, that is, a stand-by state, an operating state, and a maintenance state. For example, when the resting unit 10A stands by in a predetermined place, or the like, it is assumed that the resting unit 10A is in the stand-by state. The predetermined place may be, for example, a maintenance shop in which the resting unit 10A is maintained and stored. In addition, when the resting unit 10A is coupled to the traveling unit 10B and is carried toward the parking lot, and when the resting unit 10A is arranged as a resting place in the parking lot, it is assumed that the resting unit 10A is in the operating state. Further, when the resting unit 10A has not yet been maintained after the user has left the resting unit 10A, it is assumed that the resting unit 10A is in the maintenance state.

For example, when the server 30 transmits, to the traveling unit 10B, a command to carry the resting unit 10A, the resting unit 10A enters the operating state. Alternatively, for example, when a signal indicating that the user has left the resting unit 10A is transmitted from the user terminal 20 to the server 30, the resting unit 10A enters the maintenance state. Alternatively, when information indicating that maintenance of the resting unit 10A is completed is transmitted to the server 30 from, for example, a terminal of the maintenance shop, the resting unit 10A enters the stand-by state. The server 30 can select a resting unit 10A in the stand-by state as a resting place. On the other hand, the server 30 cannot select a resting unit 10A in the operating state or the maintenance state as a resting place.

Meanwhile, the operating state of the traveling unit 10B is information for determining which state the traveling unit 10B is in. The operating state of the traveling unit 10B is divided into two states, that is, a stand-by state and an operating state. For example, when the traveling unit 10B is carrying the resting unit 10A to the destination or when the traveling unit 10B is scheduled to carry the resting unit 10A to the destination, it is assumed that the traveling unit 10B is in the operating state. Alternatively, when the traveling unit 10B is not carrying the resting unit 10A and is not scheduled to carry the resting unit 10A, it is assumed that the traveling unit 10B is in the stand-by state.

For example, when the server 30 transmits, to the traveling unit 10B, a command to carry the resting unit 10A, the traveling unit 10B enters the operating state. The operating state includes a time when the traveling unit 10B arranges the resting unit 10A in the parking lot and a time when the traveling unit 10B collects the resting unit 10A from the parking lot. In addition, when a signal indicating that the traveling unit 10B has arranged the resting unit 10A in the parking lot is transmitted from the traveling unit 10B to the server 30 or when the traveling unit 10B has moved from the parking lot, the traveling unit 10B enters the stand-by state. Alternatively, when a signal indicating that the traveling unit 10B has arranged the resting unit 10A in the maintenance shop is transmitted from the traveling unit 10B to the server 30 or when the traveling unit has moved from the maintenance shop, the traveling unit 10B enters the stand-by state.

The vehicle management unit 301 stores the operating state of the resting unit 10A in the resting unit information DB 313 in association with the resting unit ID, and stores the operating state of the traveling unit 10B in the traveling unit information DB 314 in association with the traveling unit ID.

The vehicle selection unit 302 selects a resting unit 10A and a traveling unit 10B used for providing the user with a resting place from among, for example, the resting units 10A in the stand-by state and the traveling units 10B in the stand-by state. When there are a plurality of resting units 10A and traveling units 10B in the stand-by state, for example, the vehicle selection unit 302 may select a resting unit 10A and a traveling unit 10B that are respectively closest to the parking lot which is the destination, or randomly select a resting unit 10A and a traveling unit 10B. Alternatively, when the traveling units 10B are electrically driven, the vehicle selection unit 302 may select a traveling unit 10B having a high battery charging rate. Alternatively, the vehicle selection unit 302 may select a combination of a resting unit 10A and a traveling unit 10B such that a movement distance of the traveling unit 10B is shortest. Alternatively, the vehicle selection unit 302 may select a combination of a resting unit 10A and a traveling unit 10B such that a time period until the resting unit 10A is arranged in the parking lot is shortest. Alternatively, the vehicle selection unit 302 may select a combination of a resting unit 10A and a traveling unit 10B such that a movement distance of the traveling unit 10B is within a predetermined distance. The predetermined distance may be, for example, a movement distance within an allowable range.

The request acquisition unit 303 acquires, for example, a resting request transmitted from the user terminal 20. The resting request is information transmitted from the user when he/she requests an arrangement of a resting unit 10A in which the user can take a rest. The resting request includes position information of the user. The resting request is generated in the user terminal 20 when the user makes a predetermined input to the input unit 24 of the user terminal 20.

The parking lot information acquisition unit 304 acquires, for example, information on a parking lot. The information on a parking lot includes information on a position of a parking lot and information on vacant parking spaces in the parking lot. The above information will be referred to as "parking lot information" hereinbelow. The parking lot information may be acquired from, for example, an external server that manages a parking lot, a computer installed in the parking lot, or image data obtained by capturing an image of the parking lot. Upon acquiring the parking lot information, the parking lot information acquisition unit 304 stores the parking lot information in the parking lot information DB 312 to be described below.

The parking lot selection unit 305 selects a parking lot in which the resting unit 10A will be arranged from among the vacant parking lots. When the request acquisition unit 303 acquires the resting request, the parking lot selection unit 305 selects a vacant parking lot, in which the resting unit 10A will be arranged, within a predetermined area from the current position of the user (that is, the current position of the user terminal 20) who has transmitted the resting request. The parking lot selection unit 305 refers to the user information DB 311 and acquires the position information of the user corresponding to the resting request. Furthermore, the parking lot selection unit 305 refers to the parking lot information DB 312 and selects a parking lot within the predetermined area from the current position of the user. The parking lot selection unit 305 may select a parking lot closest to the current position of the user or randomly select a parking lot. The predetermined area is set, for example, according to a distance which the user can walk. Alternatively, the predetermined area may be an area designated by the user.

The command generation unit 306 generates an operation command such that, for example, the traveling unit 10B departs from the current position (for example, a base), is coupled to the resting unit 10A at a place (for example, a maintenance shop) in which the resting unit 10A stands by, and then moves to the selected parking lot and arrange the resting unit 10A therein. Further, the command generation unit 306 may generate the operation command such that the traveling unit 10B decoupled from the resting unit 10A returns to the base. Then, the command generation unit 306 transmits the generated operation command to the traveling unit 10B. In addition, the command generation unit 306 generates, for example, a route along which the user moves from the current position to the parking lot selected by the parking lot selection unit 305. Upon generating the route of the user, the command generation unit 306 transmits information on the route to the user terminal 20. The command generation unit 306 according to the present embodiment generates routes along which the traveling unit 10B and the user respectively move, based on map information stored in the map information DB 315 to be described below. The command generation unit 306 may generate each route such that the route is according to predetermined rules, such as a route having a shortest movement distance or a route having a shortest movement time period.

The user information DB 311 is formed by storing user information in the secondary storage unit 33. The user information includes, for example, a user ID and position information of the user in association with the user. Here, a configuration of the user information stored in the user information DB 311 will be described with reference to FIG. 4. FIG. 4 is a table exemplifying a composition of user information. The user information table includes fields for a user ID, a current position, and a resting state. Information for specifying the user or the user terminal 20 is input in the user ID field. Position information of the user is input in the current position field. The position information of the user is included in the resting request. Information on the user's resting state is input in the resting state field. Any one of "requested", "arranged", or "finished" is input as the information on the resting state in the resting state field. For example, "requested" is input from a time when the server 30 receives the resting request to a time when the server 30 selects a parking lot, a resting unit 10A, and a traveling unit 10B. In addition, "arranged" is input from a time when the server 30 selects a parking lot, a resting unit 10A, and a traveling unit 10B to a time when the server 30 receives a leaving request. The leaving request is information transmitted from the user terminal 20 when the user leaves the resting unit 10A, and is information indicating that the user is leaving the resting unit 10A. The leaving request includes the user ID. Further, "finished" is input after the server 30 receives the leaving request.

The parking lot information DB 312 is formed by storing the above parking lot information in the secondary storage unit 33. Here, a configuration of the parking lot information stored in the parking lot information DB 312 will be described with reference to FIG. 5. FIG. 5 is a table exemplifying a composition of parking lot information. The parking lot information table includes fields for a parking lot ID, a position, and a vacant parking space. Information for specifying the parking lot is input in the parking lot ID field. The parking lot ID may be an ID of an entire parking lot in which a plurality of vehicles can be parked or an ID corresponding to each parking space in the entire parking lot in which a plurality of vehicles can be parked. Information on the position of the parking lot (for example, the latitude and longitude, or an address) is input in the position field. The information on the position of the parking lot is registered in advance. Information on the vacant parking space in the parking lot is input in the vacant parking space field. When there is a vacant parking space in the parking lot, "Yes" is input, and when there is no vacant parking space, "No" is input.

Figures 6, 7, 8:
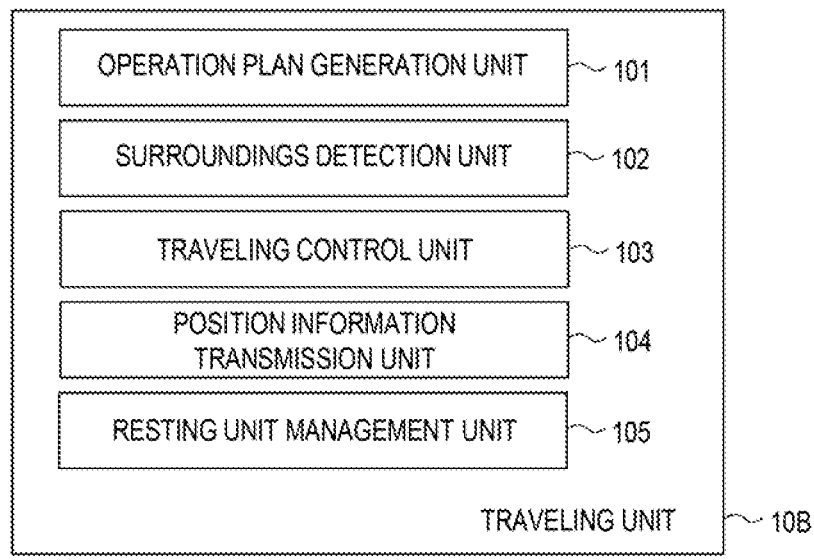
FIG. 6 is a table exemplifying a composition of resting unit information.
FIG. 7 is a table exemplifying a composition of traveling unit information.
FIG. 8 is a diagram illustrating an example of a functional configuration of the traveling unit.

The resting unit information DB 313 is formed by storing information on the resting unit 10A (hereinafter, also referred to as "resting unit information") in the secondary storage unit 33. Here, a configuration of the resting unit information stored in the resting unit information DB 313 will be described with reference to FIG. 6. FIG. 6 is a table exemplifying a composition of resting unit information. The resting unit information table includes fields for a resting unit ID, position information, an operating state, and a user ID. Identification information for specifying the resting unit 10A is input in the resting unit ID field. The position information of the resting unit 10A transmitted by the traveling unit 10B is input in the position information field. The position information is information indicating the current position of the resting unit 10A. When the resting unit 10A is decoupled from the traveling unit 10B, the current position of the resting unit 10A is fixed until the next time when the resting unit 10A is coupled to a traveling unit 10B. Information indicating which state the resting unit 10A is in is input in the operating state field. Any one of "stand-by", "operating", or "under maintenance" is input in the operating state field. "Stand-by" indicates a state where the resting unit 10A stands by in a maintenance shop, or the like, "operating" indicates a state where the resting unit 10A is coupled to the traveling unit 10B and is moving toward the parking lot or a state where the resting unit 10A is arranged in the parking lot, and "under maintenance" indicates a state where the resting unit 10A needs maintenance after the user has left the resting unit 10A. The user ID of the user who is using the resting unit 10A is input in the user ID field. Therefore, when the leaving request is transmitted from the user terminal 20, it is possible to determine the corresponding resting unit 10A based on the user ID.

The traveling unit information DB 314 is formed by storing information on the traveling unit 10B (hereinafter, also referred to as "traveling unit information") in the secondary storage unit 33. Here, a configuration of the traveling unit information stored in the traveling unit information DB 314 will be described with reference to FIG. 7. FIG. 7 is a table exemplifying a composition of traveling unit information. The traveling unit information table includes fields for a traveling unit ID, position information, and an operating state. Information for specifying the traveling unit 10B is input in the traveling unit ID field. The position information of the traveling unit 10B is input in the position information field. The position information is information indicating the current position of the traveling unit 10B. Information indicating which state the traveling unit 10B is in is input in the operating state field. Any one of "operating" or "stand-by" is input in the operating state field. "Operating" indicates a state where the traveling unit 10B is carrying the resting unit 10A to the destination or a state where the traveling unit 10B is scheduled to carry the resting unit 10A to the destination, and "stand-by" indicates a state where the traveling unit 10B is not carrying the resting unit 10A and is not scheduled to carry the resting unit 10A. The state where the traveling unit 10B is not scheduled to carry the resting unit 10A is, for example, at least one of a state where there is no operation command to carry the resting unit 10A and a state after the arrangement of the resting unit 10A is completed. The operating state may be transmitted by the traveling unit 10B or determined by the server 30 based on the current position of the traveling unit 10B.

The map information DB 315 stores the map information that includes map data and point-of-interest (POI) information, such as characters and photographs, indicating features of each point on the map data. The map information DB 315 may be provided from another system connected to the network N1, for example, a geographic information system (GIS).

Functional Configuration: Traveling Unit

FIG. 8 is a diagram illustrating an example of a functional configuration of the traveling unit 10B. The traveling unit 10B includes, as functional components, an operation plan generation unit 101, a surroundings detection unit 102, a traveling control unit 103, a position information transmission unit 104, and a resting unit management unit 105. The operation plan generation unit 101, the surroundings detection unit 102, the traveling control unit 103, the position information transmission unit 104, and the resting unit management unit 105 are functional components provided when, for example, the processor 11 of the traveling unit 10B of the vehicle 10 executes various programs stored in the secondary storage unit 13.

The operation plan generation unit 101 acquires an operation command from the server 30 and generates its own operation plan. The operation command includes information on a stopover, through which the traveling unit 10B passes, and a destination. The stopover may include a point at which the traveling unit 10B is coupled to the resting unit 10A. The operation plan generation unit 101 calculates a route along which the traveling unit 10B moves based on the operation command acquired from the server 30, and generates an operation plan for moving according to the route.

The surroundings detection unit 102 detects the surroundings of the traveling unit 10B needed for autonomous traveling based on data acquired by the surroundings information sensor 18. Examples of targets to be detected include the number and positions of vehicle lanes, the number and positions of other mobile objects around the traveling unit 10B, the number and positions of obstacles (for example, pedestrians, bicycles, structures, and buildings) around the traveling unit 10B, the structure of roads, and road signs, but are not limited thereto. The target to be detected may be any target as long as it is needed for the autonomous traveling. For example, when the surroundings information sensor 18 is a stereo camera, an object around the traveling unit 10B is detected by executing image processing on data of an image captured by the stereo camera. The data (hereinafter, referred to as "surroundings data") on the surroundings of the traveling unit 10B detected by the surroundings detection unit 102 is transmitted to the traveling control unit 103 to be described below.

The traveling control unit 103 generates a control command for controlling the autonomous traveling of the traveling unit 10B based on the operation plan generated by the operation plan generation unit 101, the surroundings data generated by the surroundings detection unit 102, and the position information of the traveling unit 10B acquired from the position information sensor 17. For example, the traveling control unit 103 generates a control command to cause the traveling unit 10B to travel along a predetermined route such that an obstacle does not enter a predetermined safety area around the traveling unit 10B. The generated control command is transmitted to the driving unit 19. A well-known method may be employed as a method of generating a control command to cause the traveling unit 10B to autonomously travel.

The position information transmission unit 104 transmits, to the server 30, position information acquired from the position information sensor 17 via the communication unit 16. A timing at which the position information transmission unit 104 transmits the position information can be appropriately set. For example, the position information may be transmitted periodically, at a timing at which some information is transmitted to the server 30, or in response to a request from the server 30. The position information transmission unit 104 transmits the position information to the server 30 together with the traveling unit ID.

The resting unit management unit 105 generates a command on coupling and decoupling the resting unit 10A to and from the traveling unit 10B. The command includes a command to instruct the coupling device 14 to couple the resting unit 10A to the traveling unit 10B, a command to instruct the coupling device 14 to decouple the resting unit 10A from the traveling unit 10B, and the like. Further, when the resting unit 10A needs to activate a certain device (for example, an illuminator or an air-conditioner) in serving as a resting place, the resting unit management unit 105 generates a command to activate the device. Examples of the commands include a command to activate the resting unit 10A.

Functional Configuration: User Terminal

FIG. 9 is a diagram illustrating an example of a functional configuration of the user terminal 20. The user terminal 20 includes, as functional components, an information transmission unit 201 and a navigation unit 202. The information transmission unit 201 and the navigation unit 202 are functional components provided when, for example, the processor 21 of the user terminal 20 executes various programs stored in the secondary storage unit 23. The information transmission unit 201 outputs, for example, an icon for requesting a rest to a touch panel display of the user terminal 20, and generates a resting request when the user clicks on the icon. The resting request includes the position information of the user. The position information of the user may be obtained by the position information sensor 27, or may be input by the user via the input unit 24. The information transmission unit 201 transmits, to the server 30, the generated resting request in association with the user ID.

The navigation unit 202 displays a map of the periphery of the current position of the user terminal 20 on the output unit 25 based on the map information stored in the secondary storage unit 23. Further, upon receiving the information on the route from the server 30, for example, the navigation unit 202 displays a map and the route on the display, or guides a moving direction according to the route via voice. A well-known technology can be used for a function of the navigation unit 202.

Flow of Processing: Server

Next, a process for transmitting an operation command by the server 30 to the traveling unit 10B will be described. FIG. 10 is an example of a flowchart of a process for transmitting an operation command according to the present embodiment. The process illustrated in FIG. 10 is executed by the processor 31 of the server 30 at every predetermined time. Here, it is assumed that the server 30 has already received information needed for constructing the parking lot information DB 312, the resting unit information DB 313, and the traveling unit information DB 314.

In step S101, the request acquisition unit 303 determines whether it has received a resting request from the user terminal 20. In step S101, when the determination is positive, the process proceeds to step S102. On the other hand, when the determination is negative, the process ends.

In step S102, the parking lot selection unit 305 selects a parking lot in which the user can take a rest from among the vacant parking lots. The parking lot selection unit 305 accesses the user information DB 311 and acquires the position information of the user terminal 20 that has transmitted the resting request. Next, the parking lot selection unit 305 accesses the parking lot information DB 312 and the map information DB 315, and selects, for example, a parking lot closest to the current position of the user from among the vacant parking lots within the predetermined area from the current position of the user. Alternatively, the parking lot selection unit 305 may randomly select one parking lot from among the vacant parking lots within the predetermined area from the current position of the user.

In step S103, the vehicle selection unit 302 selects a resting unit 10A in which the user can take a rest. The vehicle selection unit 302 accesses the resting unit information DB 313 and the map information DB 315, and selects, for example, a resting unit 10A closest to the current position of the user from among the resting units 10A of which the operating state is "stand-by".

In step S104, the vehicle selection unit 302 selects a traveling unit 10B that will carry the resting unit 10A selected in step S103. The vehicle selection unit 302 accesses the traveling unit information DB 314 and the map information DB 315, and selects, for example, a traveling unit 10B closest to the selected resting unit 10A from among the traveling units 10B of which the operating state is "stand-by". Alternatively, in steps S103 and S104, the vehicle selection unit 302 may randomly select a resting unit 10A and a traveling unit 10B such that a movement distance from a current position of the traveling unit 10B through a current position of the resting unit 10A to the parking lot is within a predetermined distance. Alternatively, the vehicle selection unit 302 may select a resting unit 10A and a traveling unit 10B such that a movement distance from a current position of the traveling unit 10B through a current position of the resting unit 10A to the parking lot is shortest.

In step S105, the command generation unit 306 generates an operation command to be transmitted to the traveling unit 10B. The command generation unit 306 generates an operation command including a command to cause the traveling unit 10B to move from the current position thereof to the current position of the resting unit 10A, to be coupled to the resting unit 10A at the current position of the resting unit 10A, to move from the current position of the resting unit 10A to the selected parking lot, and to be decoupled from the resting unit 10A in the parking lot. The operation command may include a command to cause the traveling unit 10B to move away from the parking lot or return to the base after the traveling unit 10B is decoupled from the resting unit 10A. After the command generation unit 306 generates the operation command, the process proceeds to step S106, in which the command generation unit 306 transmits the operation command to the traveling unit 10B selected in step S104. At this time, the vehicle management unit 301 updates the operating state field of the corresponding resting unit 10A in the resting unit information DB 313 from "stand-by" to "operating", and inputs the corresponding user ID in the user ID field. Further, the vehicle management unit 301 updates the operating state field of the corresponding traveling unit 10B in the traveling unit information DB 314 from "stand-by" to "operating".

In step S107, the command generation unit 306 generates a route to be transmitted to the user terminal 20. The command generation unit 306 generates a route along which the user moves from the current position of the user terminal 20 to the selected parking lot. After the command generation unit 306 generates the route, the process proceeds to step S108, in which the command generation unit 306 transmits information on the route to the user terminal 20.

In step S109, the vehicle management unit 301 determines whether the traveling unit 10B has arrived at the parking lot. In step S109, when the determination is positive, the process proceeds to step S110. On the other hand, when the determination is negative, the process returns to step S109. In step S110, the vehicle management unit 301 updates the traveling unit information DB 314. The vehicle management unit 301 changes the operating state of the corresponding traveling unit 10B in the traveling unit information DB 314 from "operating" to "stand-by". Then, the flowchart ends.

Flow of Processing: Traveling Unit

Figure 11:
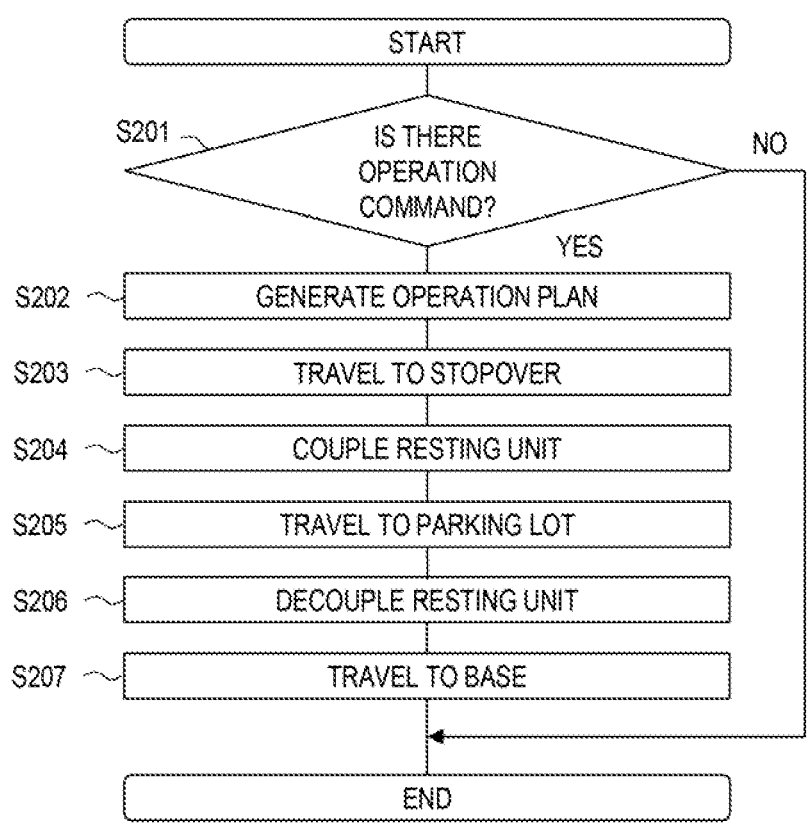
FIG. 11 is an example of a flowchart of a process for causing the traveling unit to travel according to the first embodiment.

Next, a process for causing the traveling unit 10B to travel will be described. FIG. 11 is an example of a flowchart of a process for causing the traveling unit 10B to travel according to the present embodiment. The process illustrated in FIG. 11 is executed by the processor 11 of the traveling unit 10B at every predetermined time. The flowchart is executed by the traveling unit 10B in the stand-by state.

In step S201, the operation plan generation unit 101 determines whether it has received the operation command from the server 30. In step S201, when the determination is positive, the process proceeds to step S202. On the other hand, when the determination is negative, the process ends. In step S202, the operation plan generation unit 101 generates an operation plan according to the operation command.

When the generation of the operation plan is completed, in step S203, the traveling control unit 103 generates a control command, and the driving unit 19 is controlled according to the control command such that the traveling unit 10B travels to a stopover. At the stopover, the resting unit 10A in the stand-by state is arranged. When the traveling unit 10B arrives at the stopover, the process proceeds to step S204, in which the resting unit management unit 105 controls the coupling device 14 such that the coupling device 14 couples the resting unit 10A to the traveling unit 10B. The resting unit 10A is the resting unit 10A selected by the server 30. For example, the operation command transmitted from the server 30 includes a resting unit ID corresponding to the selected resting unit 10A, and the traveling unit 10B determines the resting unit 10A based on the resting unit ID. The traveling unit 10B may identify the resting unit 10A by, for example, reading the resting unit ID displayed on the resting unit 10A using the surroundings information sensor 18, or by, for example, communicating with the resting unit 10A which includes a communication device.

When the coupling of the resting unit 10A to the traveling unit 10B is completed, the process proceeds to step S205, in which the traveling control unit 103 generates a control command, and the driving unit 19 is controlled according to the control command such that the traveling unit 10B travels to the parking lot. When the traveling unit 10B arrives at the parking lot, the process proceeds to step S206, in which the resting unit management unit 105 controls the coupling device 14 such that the coupling device 14 decouples the resting unit 10A from the traveling unit 10B. When the resting unit 10A is decoupled from the traveling unit 10B, the process proceeds to step S207. When the decoupling of the resting unit 10A from the traveling unit 10B is completed, the resting unit management unit 105 may transmit, to the server 30, information indicating that the decoupling is completed. In step S207, the traveling control unit 103 generates a control command, and the driving unit 19 is controlled according to the control command such that the traveling unit 10B travels to the base. When the traveling unit 10B arrives at the base, the process ends.

Flow of Processing: User Terminal

Figure 12:
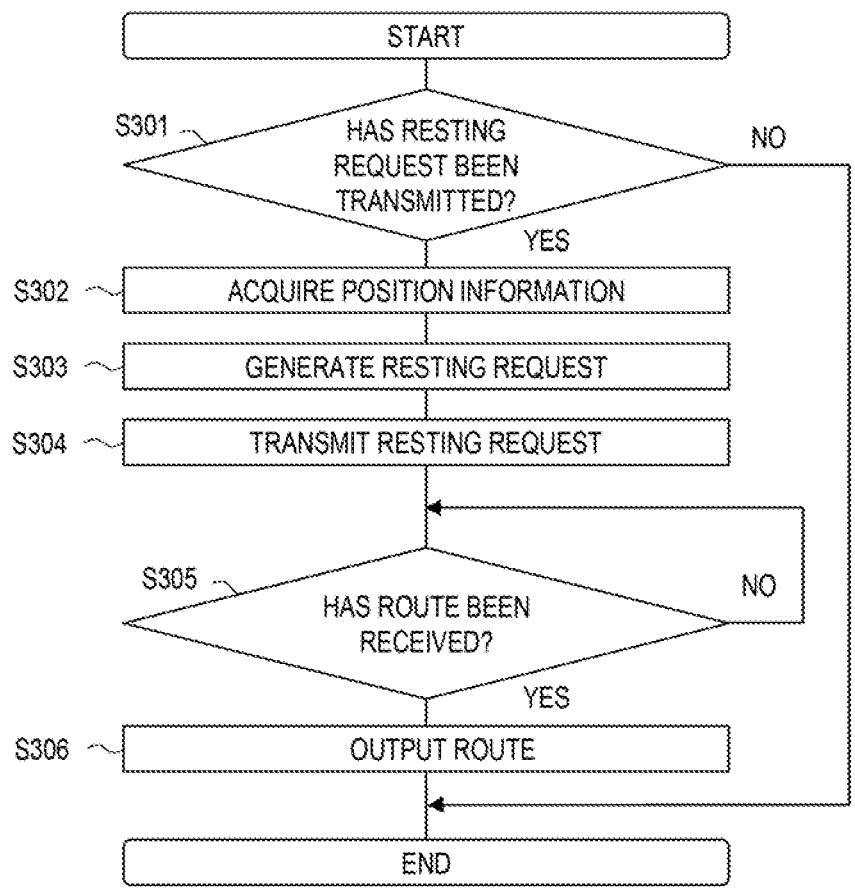
FIG. 12 is an example of a flowchart of a process for transmitting a resting request from the user terminal according to the first embodiment.

Next, a process for transmitting a resting request from the user terminal 20 will be described. FIG. 12 is an example of a flowchart of a process for transmitting a resting request from the user terminal 20 according to the present embodiment. The process illustrated in FIG. 12 is executed by the processor 21 of the user terminal 20 at every predetermined time.

In step S301, the information transmission unit 201 determines whether the user has executed an operation for transmitting the resting request via the input unit 24. The information transmission unit 201 determines, for example, whether the user has clicked on an icon for transmitting the resting request. The icon for transmitting the resting request is displayed on, for example, the touch panel display, and the information transmission unit 201 determines whether the user has clicked on the icon. A timing of transmitting the resting request is not limited to the time at which the user has clicked on the icon. In step S301, when the determination is positive, the process proceeds to step S302. On the other hand, when the determination is negative, the process ends. In step S302, the information transmission unit 201 acquires the position information of the user terminal 20. In step S303, the information transmission unit 201 generates the resting request. Then, in step S304, the information transmission unit 201 transmits the resting request to the server 30.

In step S305, the navigation unit 202 determines whether it has received the information on the route from the server 30. In step S305, when the determination is positive, the process proceeds to step S306. On the other hand, when the determination is negative, the process returns to step S305. Next, in step S306, the navigation unit 202 outputs the route to the output unit 25. Then, the navigation unit 202 guides the user to the parking lot.

As described above, with the present embodiment, it is possible to provide the user with the resting place by using the vehicle 10 that autonomously travels. At this time, since the vacant parking lot is used, the resting place can be arranged near the user. In addition, since the vacant parking lot can be effectively used, an owner of the parking lot also gains a benefit. Further, since the resting unit 10A can be decoupled from the traveling unit 10B, while the resting unit 10A is serving as the resting place, the traveling unit 10B can carry another resting unit 10A. Accordingly, the number of traveling units 10B can be smaller than the number of resting units 10A, such that the cost can be reduced.

Second Embodiment

In the present embodiment, a process after the user has finished taking a rest in the resting unit 10A will be described. When the user finishes taking a rest, the user inputs, to the user terminal 20, information that he/she has finished taking a rest via the input unit 24. Then, the user terminal 20 generates a leaving request. Upon receiving the leaving request from the user terminal 20, the server 30 selects a traveling unit 10B that will collect the resting unit 10A. The traveling unit 10B may be, for example, a traveling unit 10B of which a movement distance to the resting unit 10A to be collected is within a predetermined distance. In the present embodiment, the predetermined distance may be a distance in which the cost of collecting the resting unit 10A is within an allowable range. Alternatively, the server 30 may select, for example, a traveling unit 10B having a shortest movement distance (the traveling unit 10B closest to the resting unit 10A to be collected). Alternatively, when the traveling unit 10B is an electric vehicle, the server 30 may select, for example, a traveling unit 10B having the largest battery charging amount from among the traveling units 10B positioned within a predetermined distance from the resting unit 10A to be collected.

Upon selecting the traveling unit 10B that will collect the resting unit 10A, the server 30 generates a command to be transmitted to the traveling unit 10B. The command includes a command to travel to the parking lot in which the resting unit 10A is arranged, to be coupled to the resting unit 10A, and to carry the resting unit 10A to the maintenance shop. Upon generating the command, the server 30 transmits the command to the selected traveling unit 10B.

Upon receiving the command, the traveling unit 10B autonomously travels according to the command. Then, the traveling unit 10B collects the resting unit 10A and carries it to the maintenance shop. The maintenance shop is a place in which the resting unit 10A is maintained after use. At the maintenance shop, for example, bed-making and replenishment of consumables are executed.

Flow of Processing: Server

Figure 13:
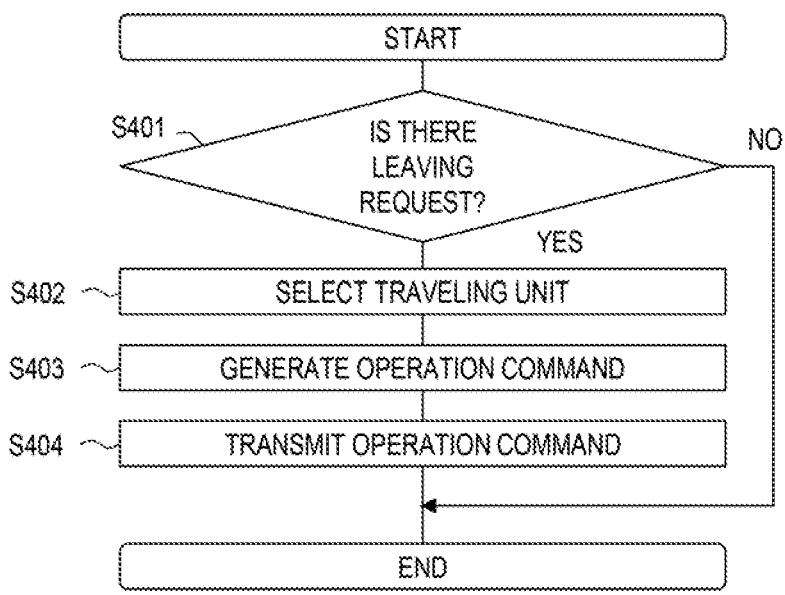
FIG. 13 is an example of a flowchart of a process for transmitting, by the server, an operation command to the traveling unit according to a second embodiment.

Next, a process for transmitting an operation command to collect the resting unit 10A by the server 30 to the traveling unit 10B will be described. FIG. 13 is an example of a flowchart of a process for transmitting, by the server 30, an operation command to the traveling unit 10B according to the present embodiment. The process illustrated in FIG. 13 is executed by the processor 31 of the server 30 at every predetermined time. Here, it is assumed that the server 30 has already received information needed for constructing the parking lot information DB 312, the resting unit information DB 313, and the traveling unit information DB 314.

In step S401, the request acquisition unit 303 determines whether it has received the leaving request from the user terminal 20. When the request acquisition unit 303 has received the leaving request from the user terminal 20, the resting unit ID corresponding to the user ID included in the leaving request is searched for in the resting unit information DB 313, and the operating state field corresponding to the resting unit ID is updated from "operating" to "under maintenance". In step S401, when the determination is positive, the process proceeds to step S402. On the other hand, when the determination is negative, the process ends.

In step S402, the vehicle selection unit 302 selects a traveling unit 10B that will collect the resting unit 10A which the user has left. The vehicle selection unit 302 accesses the traveling unit information DB 314 and the map information DB 315, and selects, for example, a traveling unit 10B closest to the resting unit 10A for which the leaving request has been made in step S401, or a traveling unit 10B of which a movement distance from a current position of the traveling unit 10B to the current position of the resting unit 10A is within a predetermined distance from among the traveling units 10B of which the operating state is "stand-by".

In step S403, the command generation unit 306 generates an operation command to be transmitted to the traveling unit 10B. The command generation unit 306 generates an operation command including a command to cause the traveling unit 10B to move from the current position thereof to the current position of the resting unit 10A, to be coupled to the resting unit 10A at the current position of the resting unit 10A, to move from the current position of the resting unit 10A to the maintenance shop, and to be decoupled from the resting unit 10A at the maintenance shop. The operation command may include a command to cause the traveling unit 10B to return to the base after being decoupled from the resting unit 10A. After the command generation unit 306 generates the operation command, the process proceeds to step S404, in which the command generation unit 306 transmits the operation command to the traveling unit 10B. At this time, the vehicle management unit 301 updates the operating state of the corresponding traveling unit 10B in the traveling unit information DB 314 from "stand-by" to "operating". Further, the vehicle management unit 301 deletes the user ID from the user ID field of the corresponding resting unit 10A in the resting unit information DB 313.

Flow of Processing: Traveling Unit

Figure 14:
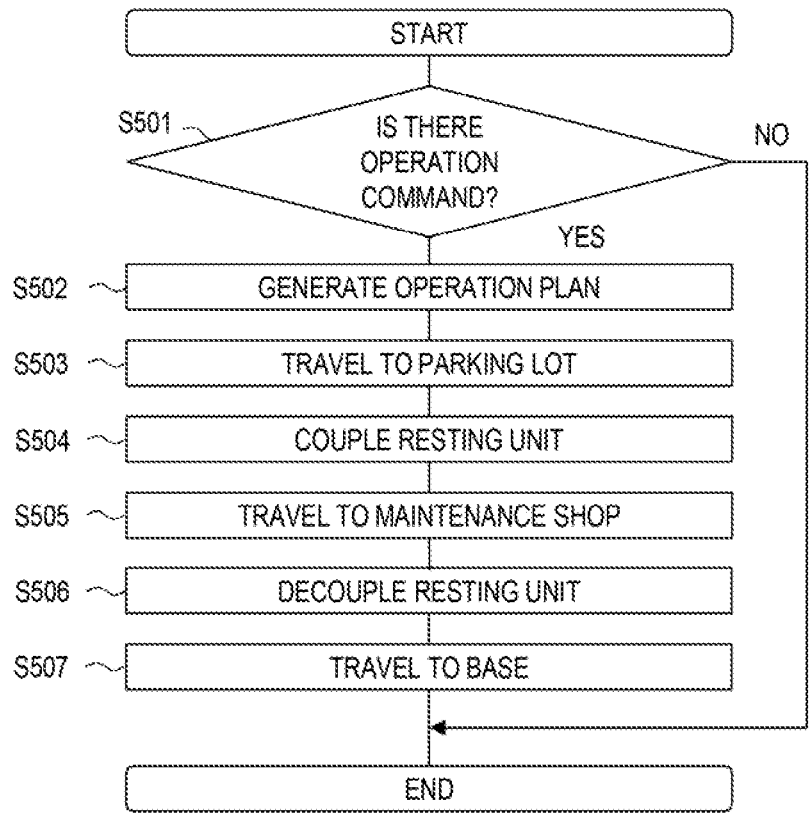
FIG. 14 is an example of a flowchart of a process for causing the traveling unit to travel when collecting the resting unit according to the second embodiment.

Next, a process for causing the traveling unit 10B to travel when the resting unit 10A is collected will be described. FIG. 14 is an example of a flowchart of a process for causing the traveling unit 10B to travel when the resting unit 10A is collected according to the present embodiment. The process illustrated in FIG. 14 is executed by the processor 11 of the traveling unit 10B at every predetermined time. The flowchart is executed by the traveling unit 10B in the stand-by state.

In step S501, the operation plan generation unit 101 determines whether it has received the operation command from the server 30. In step S501, when the determination is positive, the process proceeds to step S502. On the other hand, when the determination is negative, the process ends. In step S502, the operation plan generation unit 101 generates an operation plan according to the operation command.

When the generation of the operation plan is completed, in step S503, the traveling control unit 103 generates a control command, and the driving unit 19 is controlled according to the control command such that the traveling unit 10B travels to the parking lot. In this parking lot, the resting unit 10A which the user has left is arranged. Then, when the traveling unit 10B arrives at the parking lot, the process proceeds to step S504, in which the resting unit management unit 105 controls the coupling device 14 such that the coupling device 14 couples the resting unit 10A to the traveling unit 10B. The resting unit ID of the resting unit 10A is included in the operation command from the server 30, and the traveling unit 10B determines the resting unit 10A based on the resting unit ID.

When the coupling of the resting unit 10A to the traveling unit 10B is completed, the process proceeds to step S505, in which the traveling control unit 103 generates a control command, and the driving unit 19 is controlled according to the control command such that the traveling unit 10B travels to the maintenance shop. Then, when the traveling unit 10B arrives at the maintenance shop, the process proceeds to step S506, in which the resting unit management unit 105 controls the coupling device 14 such that the coupling device 14 decouples the resting unit 10A from the traveling unit 10B. When the decoupling of the resting unit 10A from the traveling unit 10B is completed, the process proceeds to step S507. When the decoupling of the resting unit 10A is completed, the resting unit management unit 105 may transmit, to the server 30, information indicating that the decoupling is completed. In step S507, the traveling control unit 103 generates a control command, and the driving unit 19 is controlled according to the control command such that the traveling unit 10B travels to the base. When the traveling unit 10B arrives at the base, the process ends.

Flow of Processing: User Terminal

Figure 15:
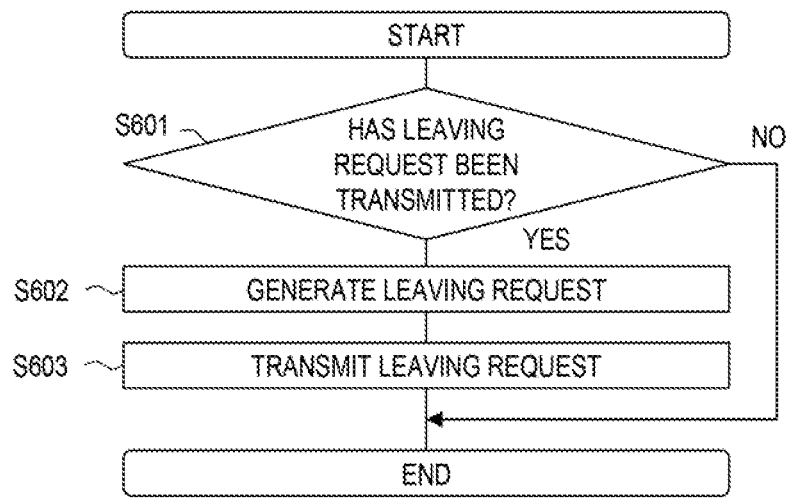
FIG. 15 is an example of a flowchart of a process for transmitting a leaving request from the user terminal according to the second embodiment.

Next, a process for transmitting a leaving request from the user terminal 20 will be described. FIG. 15 is an example of a flowchart of a process for transmitting a leaving request from the user terminal 20 according to the present embodiment. The process illustrated in FIG. 15 is executed by the processor 21 of the user terminal 20 at every predetermined time. The flowchart is executed in the user terminal 20 after transmitting the resting request.

In step S601, the information transmission unit 201 determines whether the user has executed an operation for transmitting the leaving request via the input unit 24. The information transmission unit 201 determines, for example, whether the user has clicked on an icon for transmitting the leaving request. The icon for transmitting the leaving request may be displayed on, for example, the touch panel display, and the information transmission unit 201 determines whether the user has clicked on the icon. A timing of transmitting the leaving request is not limited to the time at which the user has clicked on the icon. In step S601, when the determination is positive, the process proceeds to step S602. On the other hand, when the determination is negative, the process ends. In step S602, the information transmission unit 201 generates the leaving request. The leaving request includes information indicating that the user leaves the resting unit 10A, and the user ID. Next, in step S603, the information transmission unit 201 transmits the leaving request to the server 30.

As described above, with the present embodiment, it is possible to collect the resting place after providing the resting place to the user by using the vehicle 10 that autonomously travels, thereby preparing for a request from the next user. While the user is using the resting unit 10A, the traveling unit 10B can carry another resting unit 10A, such that efficiency of using the traveling unit 10B can be improved.

Third Embodiment

In a third embodiment, the server 30 selects a resting unit 10A according to options desired by the user. For example, the server 30 transmits information on selectable options to the user terminal 20, and the user inputs options he/she desires to the user terminal 20 via the input unit 24. Examples of the options may include whether certain equipment (such as a toilet or a shower) is installed, whether the resting unit 10A can be used with pets, whether smoking is allowed, a size or a manufacturer of a bed, and a kind of a pillow. The information on the options may be included in the resting request or may be transmitted separately from the resting request.

For example, when the user terminal 20 transmits the resting request to the server 30, the server 30 outputs, to the user terminal 20, information on the options that a resting unit 10A in the stand-by state corresponds to. Upon receiving the information on usable options, the user terminal 20 displays the usable options on the output unit 25. The user selects the options via the input unit 24. The information on the options selected by the user is transmitted from the user terminal 20 to the server 30. The server 30 selects a resting unit 10A corresponding to the selected options.

Flow of Processing: Server

Figure 16:
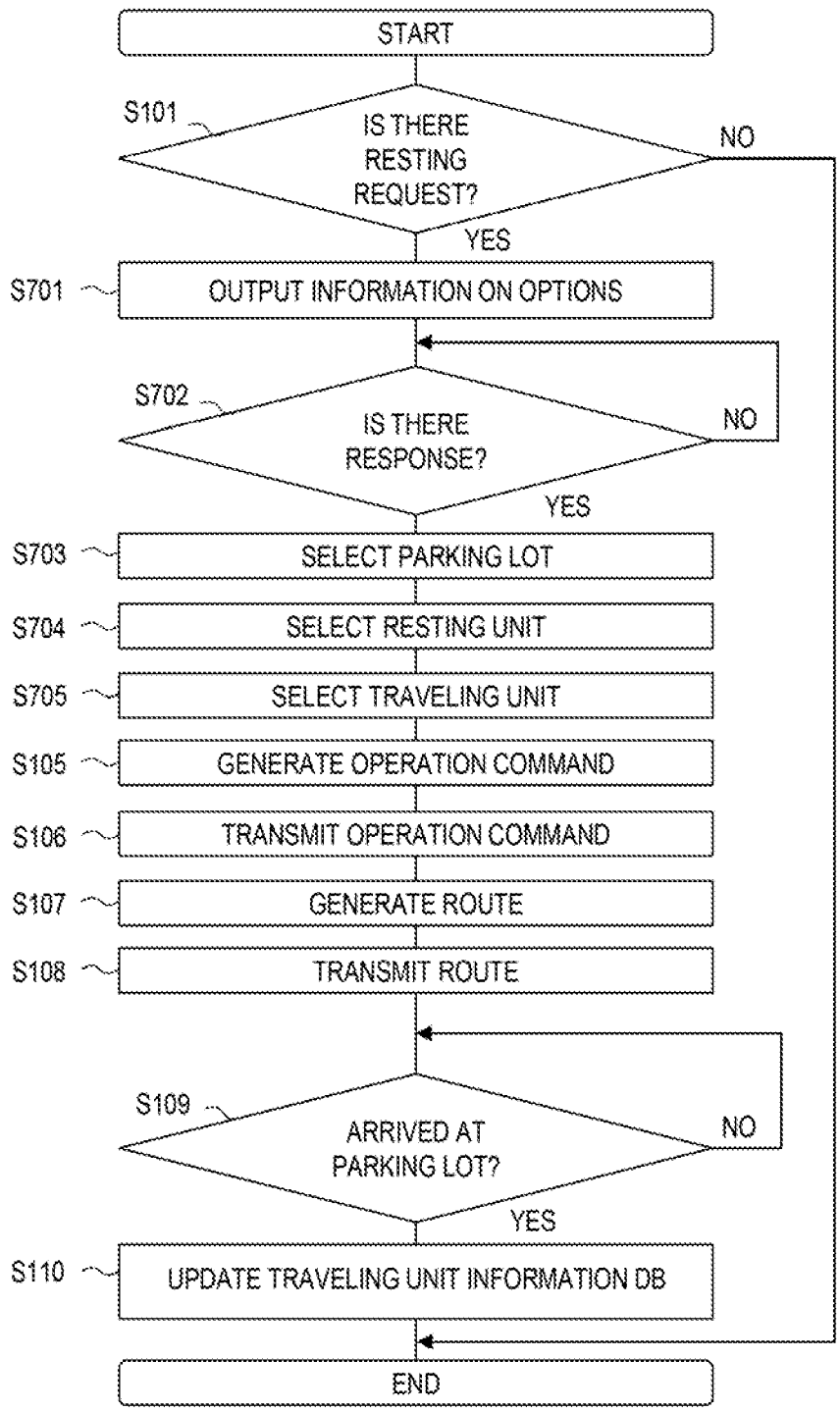
FIG. 16 is an example of a flowchart of a process for transmitting an operation command according to a third embodiment.

Next, a process for transmitting an operation command by the server 30 to the traveling unit 10B will be described. FIG. 16 is an example of a flowchart of a process for transmitting an operation command according to the present embodiment. The process illustrated in FIG. 16 is executed by the processor 31 of the server 30 at every predetermined time. Here, it is assumed that the server 30 has already received information needed for constructing the parking lot information DB 312, the resting unit information DB 313, and the traveling unit information DB 314. In addition, the same reference signs will be used for steps in which the same process as that in the flowchart illustrated in FIG. 10 is executed, and description thereof will be omitted.

In the flowchart illustrated in FIG. 16, in step S101, when the determination is positive, the process proceeds to step S701. In step S701, the request acquisition unit 303 outputs information on the selectable options to the user terminal 20. The request acquisition unit 303 acquires, for example, information on options that a resting unit 10A in the "stand-by" state corresponds to. The options that the resting unit 10A corresponds to are input in advance in, for example, the resting unit information DB 313. Next, in step S702, the request acquisition unit 303 determines whether it has received a response on the options from the user terminal 20. In step S702, when the determination is positive, the process proceeds to step S703. On the other hand, when the determination is negative, the process returns to step S702.

In step S703, the parking lot selection unit 305 selects a parking lot in which a user can take a rest from among the vacant parking lots. When a parking lot which a user can use differs depending on the options selected by the user, the parking lot selection unit 305 selects a parking lot in which the user can take a rest from among the parking lots corresponding to the options selected by the user.

In step S704, the vehicle selection unit 302 selects a resting unit 10A in which the user can take a rest. The vehicle selection unit 302 accesses the resting unit information DB 313 and the map information DB 315, and selects a resting unit 10A, for example, which is in the "stand-by" state and is closest from the user's current position, from among the resting units 10A corresponding to the options selected by the user.

In step S705, the vehicle selection unit 302 selects a traveling unit 10B that will carry the resting unit 10A selected in step S103. When a usable traveling unit 10B differs depending on the options selected by the user, the vehicle selection unit 302 selects a traveling unit 10B that will carry the resting unit 10A from among the traveling units 10B corresponding to the options selected by the user.

Flow of Processing: User Terminal

Figure 17:
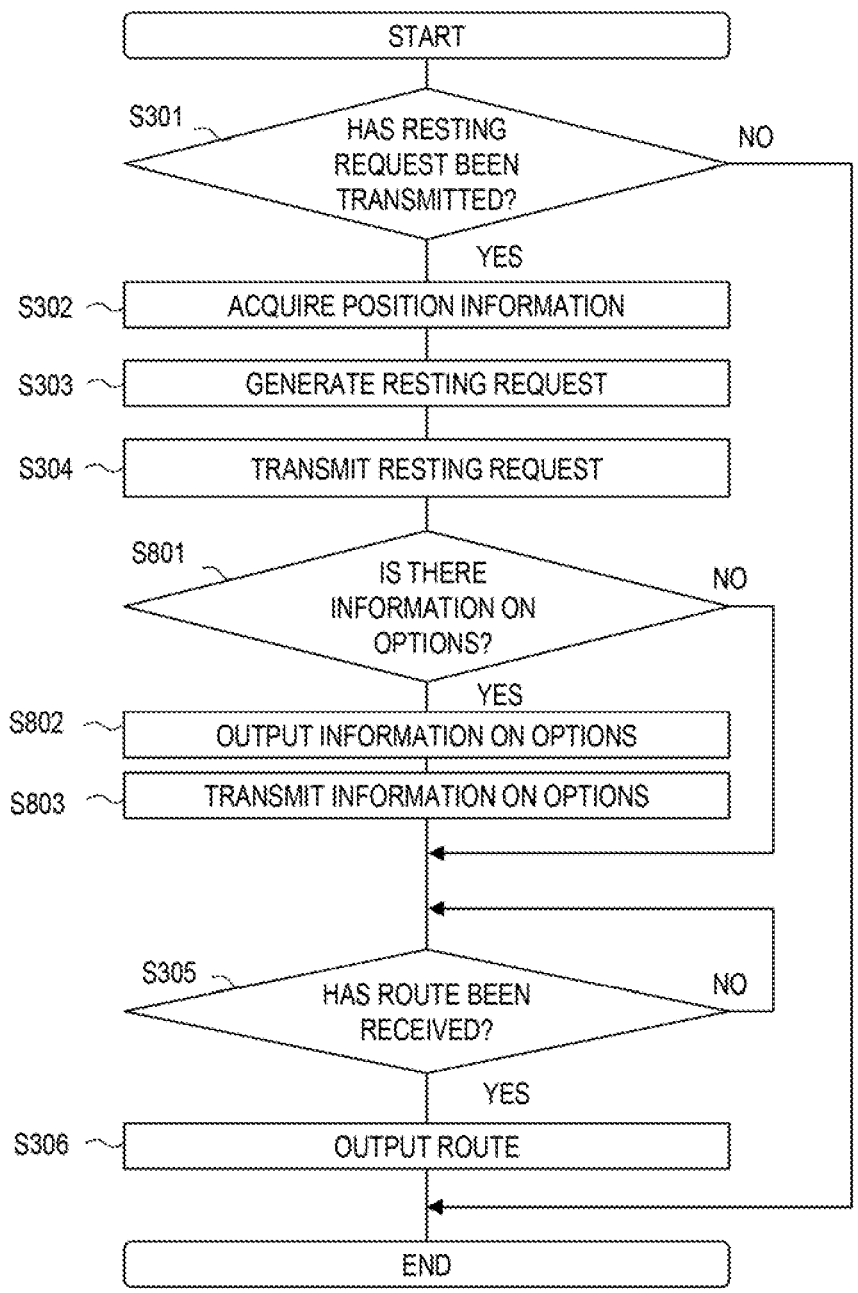
FIG. 17 is an example of a flowchart of a process for transmitting a resting request from the user terminal according to the third embodiment.

Next, a process for transmitting a resting request from the user terminal 20 will be described. FIG. 17 is an example of a flowchart of a process for transmitting a resting request from the user terminal 20 according to the present embodiment. The process illustrated in FIG. 17 is executed by the processor 21 of the user terminal 20 at every predetermined time. In addition, the same reference signs will be used for steps in which the same process as that in the flowchart illustrated in FIG. 12 is executed, and description thereof will be omitted.

In the flowchart illustrated in FIG. 17, when the process of step S304 ends, the process proceeds to step S801. In step S801, the information transmission unit 201 determines whether it has received the information on the options from the server 30. When there is no selectable option, the server 30 transmits information indicating that there is no selectable option. In step S801, when the determination is positive, the process proceeds to step S802. On the other hand, when the determination is negative, the process proceeds to step S305.

In step S802, the information transmission unit 201 outputs the information on the options to the output unit 25. Then, when the user executes a predetermined input for selecting options in the input unit 24, in step S803, the information transmission unit 201 transmits information on the selected option to the server 30.

As such, the user can select an option and take a rest more comfortably.

Other Embodiments

The above-described embodiments are merely examples, and the present disclosure can be appropriately modified and implemented within a range not departing from the scope thereof.

The above processes or elements described in the present disclosure can be freely combined and implemented as long as no technical contradiction occurs.

Further, the processes described as being executed by one device may be executed in a shared manner by a plurality of devices. Alternatively, the processes described as being executed by different devices may be executed by one device. In the computer system, the hardware configuration (the server configuration) that implements each function can be flexibly changed. In the above embodiment, the server 30 includes, as functional components, the vehicle management unit 301, the vehicle selection unit 302, the request acquisition unit 303, the parking lot information acquisition unit 304, the parking lot selection unit 305, the command generation unit 306, and the user information DB 311, the parking lot information DB 312, the resting unit information DB 313, the traveling unit information DB 314, and the map information DB 315, but some or all of these functional components may be included in the vehicle 10.

Moreover, the resting unit 10A may include a processor, a primary storage unit, a secondary storage unit, a coupling device, a communication unit, a position information sensor, a surroundings information sensor, and the like. In this case, for example, the resting unit 10A may transmit the position information to the server 30. Alternatively, for example, the resting unit 10A may notify the traveling unit 10B, approaching the resting unit 10A, of the position of the resting unit 10A. Alternatively, the resting unit 10A may include a terminal, and the terminal may transmit a leaving request to the server. For example, the user may operate a terminal provided at the resting unit 10A at a time of leaving to generate a leaving request at the terminal, and may transmit the leaving request to the server.

The present disclosure can also be implemented by supplying a computer program having the functions described in the above embodiments to a computer, and reading and executing the program by one or more processors included in the computer. Such a computer program may be provided to the computer by a non-transitory computer-readable storage medium that can be connected to the computer system bus, or provided to the computer via the network. Examples of the non-transitory computer-readable storage medium include any kind of disk, such as a magnetic disk (a Floppy® disk, a hard disk drive (HDD), and the like), an optical disk (a CD-ROM, a DVD disk, a Blu-ray disk, and the like), a read-only memory (ROM), a random access memory (RAM), an EPROM, an EEPROM, a magnetic card, a flash memory, an optical card.

What is claimed is:

1. An information processing device configured to control a traveling unit which is coupled to a resting unit including equipment on which a user takes a rest and carries the resting unit, the traveling unit being movable even while not coupled to the resting unit, the information processing device comprising a control unit configured to:
select a first parking lot in which the resting unit is to be arranged from among vacant parking lots within a predetermined area including a current position of a terminal owned by the user who desires to take the rest;
transmit, to the terminal, information on movement from the current position of the terminal to the first parking lot; and
transmit, to a first traveling unit, a command to carry a first resting unit to the first parking lot and arrange the first resting unit in the first parking lot.

2. The information processing device according to claim 1, wherein the control unit is configured to generate the command such that the first traveling unit moves away from the first parking lot after arranging the first resting unit in the first parking lot.

3. The information processing device according to claim 1, wherein the command includes information on movement of the first traveling unit from a current position of the first traveling unit through a current position of the first resting unit to the first parking lot.

4. The information processing device according to claim 1, wherein the control unit is configured to select a parking lot closest to the current position of the terminal as the first parking lot from among the vacant parking lots.

5. The information processing device according to claim 1, wherein the control unit is configured to select the first resting unit and the first traveling unit such that a movement distance of the first traveling unit from a current position of the first traveling unit to the first parking lot is within a predetermined distance.

6. The information processing device according to claim 1, wherein the control unit is configured to select the first resting unit and the first traveling unit such that a movement distance of the first traveling unit from a current position of the first traveling unit to the first parking lot is shortest.

7. The information processing device according to claim 1, wherein the control unit is configured to, when information that the user has left the first resting unit is acquired, transmit, to a second traveling unit, a command to collect the first resting unit.

8. The information processing device according to claim 7, wherein the command transmitted to the second traveling unit includes information on movement of the second traveling unit from a current position of the second traveling unit through the first parking lot to a predetermined place.

9. The information processing device according to claim 7, wherein the control unit is configured to select the second traveling unit such that a movement distance of the second traveling unit from a current position of the second traveling unit to the first parking lot is within a second predetermined distance.

10. The information processing device according to claim 7, wherein the control unit is configured to select the second traveling unit such that a movement distance of the second traveling unit from a current position of the second traveling unit to the first parking lot is shortest.

11. The information processing device according to claim 1, wherein the control unit is configured to select the first resting unit based on information on an option acquired from the terminal.

12. An information processing method for controlling a traveling unit which is coupled to a resting unit including equipment on which a user takes a rest and carries the resting unit, and is executed by a computer, the traveling unit being movable even while not coupled to the resting unit, the information processing method comprising:
selecting a first parking lot in which the resting unit is to be arranged from among vacant parking lots within a predetermined area including a current position of a terminal owned by the user who desires to take the rest;
transmitting, to the terminal, information on movement from the current position of the terminal to the first parking lot; and
transmitting, to a first traveling unit, a command to carry a first resting unit to the first parking lot and arrange the first resting unit in the first parking lot.

13. The information processing method according to claim 12, wherein the command is generated such that the first traveling unit moves away from the first parking lot after arranging the first resting unit in the first parking lot.

14. The information processing method according to claim 12, wherein a parking lot closest to the current position of the terminal is selected as the first parking lot from among the vacant parking lots.

15. The information processing method according to claim 12, further comprising selecting the first resting unit and the first traveling unit such that a movement distance of the first traveling unit from a current position of the first traveling unit to the first parking lot is within a predetermined distance.

16. The information processing method according to claim 12, further comprising selecting the first resting unit and the first traveling unit such that a movement distance of the first traveling unit from a current position of the first traveling unit to the first parking lot is shortest.

17. The information processing method according to claim 12, further comprising transmitting, to a second traveling unit, a command to collect the first resting unit when information that the user has left the first resting unit is acquired.

18. A non-transitory storage medium storing a program that causes a computer to control a traveling unit which is coupled to a resting unit including equipment on which a user takes a rest and carries the resting unit, the traveling unit being movable even while not coupled to the resting unit, the program causing the computer to execute:
selecting a first parking lot in which the resting unit is to be arranged from among vacant parking lots within a predetermined area including a current position of a terminal owned by the user who desires to take the rest;
transmitting, to the terminal, information on movement from the current position of the terminal to the first parking lot; and
transmitting, to a first traveling unit, a command to carry a first resting unit to the first parking lot and arrange the first resting unit in the first parking lot.

19. The non-transitory storage medium according to claim 18, wherein the program causes the computer to generate the command such that the first traveling unit moves away from the first parking lot after arranging the first resting unit in the first parking lot.

20. The non-transitory storage medium according to claim 18, wherein the program causes the computer to transmit, to a second traveling unit, a command to collect the first resting unit when information that the user has left the first resting unit is acquired.

\* \* \* \* \*